United States Patent
Wright et al.

(10) Patent No.: US 9,777,187 B2
(45) Date of Patent: Oct. 3, 2017

(54) COATING METHOD FOR SURFACES IN CHEMICAL INSTALLATIONS

(71) Applicant: Akzo Nobel Coatings International B.V., Arnhem (NL)

(72) Inventors: Anthony Colin Wright, Newcastle-upon-tyne (GB); Matthew George Unthank, Whitley Bay (GB); Colin Cameron, Stocksfield (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/039,299

(22) PCT Filed: Dec. 1, 2014

(86) PCT No.: PCT/EP2014/076121
§ 371 (c)(1),
(2) Date: May 25, 2016

(87) PCT Pub. No.: WO2015/082409
PCT Pub. Date: Jun. 11, 2015

(65) Prior Publication Data
US 2017/0051176 A1     Feb. 23, 2017

(30) Foreign Application Priority Data
Dec. 3, 2013   (EP) .................................... 13195542

(51) Int. Cl.
*C09D 163/00* (2006.01)
*B65D 25/14* (2006.01)
*B65D 25/34* (2006.01)
*C09D 183/06* (2006.01)
*C08G 77/14* (2006.01)

(52) U.S. Cl.
CPC ........... *C09D 163/00* (2013.01); *B65D 25/14* (2013.01); *B65D 25/34* (2013.01); *C09D 183/06* (2013.01); *C08G 77/14* (2013.01)

(58) Field of Classification Search
CPC .... C09D 163/00; C09D 183/06; B65D 25/14; B65D 25/34; C08G 77/14
See application file for complete search history.

(56) References Cited

U.S. PATENT DOCUMENTS

| 2013/0224496 A1 | 8/2013 | Palmateer et al. |
| 2013/0237638 A1 | 9/2013 | Donaldson et al. |

FOREIGN PATENT DOCUMENTS

| WO | 2004/033570 A1 | 4/2004 |
| WO | 2013/110046 A1 | 7/2013 |

*Primary Examiner* — Michael C Miggins
(74) *Attorney, Agent, or Firm* — McDonnell Boehnen Hulbert & Berghoff LLP

(57) ABSTRACT

The invention pertains to a method for providing a metallic or concrete surface of a chemical installation with a coating, which comprises the steps of—providing a coating composition comprising epoxy-functional resin, and amine curing agent for the epoxy-functional resin, wherein the coating composition comprises an organic silicon-containing compound selected from the group of organosilanes and organosiloxanes, with the molar ratio between the silicon atoms of the organic silicon-containing compound and the epoxy-groups in the coating composition being in the range of 0.20-0.75:1.00, —applying the coating composition to a metallic or concrete surface of a chemical installation to form a coating layer, and—allowing the coating layer to cure at a temperature in the range of 0 to 50° C. The invention also pertains to a chemical installation comprising a metallic or concrete surface provided with a lining of a cured coating composition and to a coating composition suitable for providing a metallic or concrete surface of a chemical installation with a coating. It has been found that the coating composition of the present invention shows a wide application spectrum and a high chemical resistance.

18 Claims, No Drawings

COATING METHOD FOR SURFACES IN CHEMICAL INSTALLATIONS

This application is a US national phase of international application PCT/EP2014/076121, filed Dec. 1, 2014, which claims priority to European application 13195542.9, filed Dec. 3, 2013.

The present invention relates to a method for providing a metallic or concrete surface of a chemical installation with a coating. The invention also relates to compositions suitable for use as coating for metallic or concrete surfaces in chemical installations, and to the chemical installations provided with said coating.

In chemical installations, metallic and concrete surfaces come into contact with a wide variety of chemical compounds. These surfaces are generally provided with a coating, which serves two purposes. In the first place, the coating is intended to protect the surface from the chemical at issue. In the second place, the coating is to protect the chemical from contamination by the surface of the installation (e.g. a tank), e.g., by corrosion. To be broadly applicable, a coating used in this application should be able to handle interaction with a broad spectrum of chemical compounds. Additionally, the coating should be able to handle conditions of elevated temperature and pressure.

An additional issue occurs for surfaces which sequentially come into contact with more than one type of chemical. This is the case, e.g., for storage or transport tanks, which are used to store or transport liquid bulk chemicals, on land or by sea. A key feature for coatings which come into contact with different types of chemicals is the interaction with the various chemicals, where the aim is to avoid contamination of subsequent chemicals. Therefore, on the one hand, absorption can occur of the bulk chemicals in contact with the surface, and this absorption should be minimized. On the other hand, if chemicals are absorbed by the coating, they should easily be removed by conventional washing processes. This can be described as the coating having a high chemical resistance, wherein the term chemical resistance refers to the propensity of the coating to absorb and subsequently desorb a chemical, whilst maintaining film integrity.

WO2012/119968 describes a coating composition comprising a mixture of epoxy resins, a curing agent, an accelerator or a mixture of accelerators, and one or more fillers or pigments, wherein the mixture of epoxy resins comprises 60-80 wt. % of an RDGE epoxy resin and 20-40 wt. % of an epoxy novolac resin. The coating composition is described as a tank lining composition.

While the coating composition described in this reference shows good properties when used as a tank lining coating, there is still need for alternative coating compositions suitable for providing a coating onto a metallic or concrete surface of a chemical installation, which has a wide application spectrum and a high chemical resistance. By wide application spectrum, we mean that the coating composition can be applied and cured across a range of temperatures (for example, from 5° C. to 35° C.), and the coating will deliver good coating properties (good adhesion, good film-integrity) and also chemical resistance.

The present invention provides such a coating composition. The present invention also provides a method for providing concrete or metallic surface of a chemical installation with a cured coating layer, and to a surface provided with such a layer.

SUMMARY OF THE INVENTION

In one embodiment the invention pertains to a method for providing a metallic or concrete surface of a chemical installation with a coating, which comprises the steps of
  providing a coating composition comprising epoxy-functional resin, and amine curing agent for the epoxy-functional resin, wherein the coating composition comprises an organic silicon-containing compound selected from the group of organosilanes and organosiloxanes, with the molar ratio between the silicon atoms of the organic silicon-containing compound and the epoxy-groups in the coating composition being in the range of 0.20-0.75:1.00.
  applying the coating composition to a metallic or concrete surface of a chemical installation to form a coating layer, and
  allowing the coating layer to cure at a temperature in the range of 0 to 50° C.

In one example, the molar ratio between the silicon atoms of the organic silicon-containing compound and the epoxy-groups in the coating composition is in the range of 0.25-0.75:1.00.

In a further embodiment, the invention pertains to a chemical installation comprising a metallic or concrete surface provided with a lining of a cured coating composition, wherein the cured coating composition is derived from a coating composition comprising epoxy-functional resin and amine curing agent for the epoxy-functional resin, wherein the coating composition comprises an organic silicon-containing compound selected from the group of organosilanes and organosiloxanes, with the molar ratio between the silicon atoms of the organic silicon-containing compound and the epoxy-groups in the coating composition being in the range of 0.20-0.75:1.00.

In one example, the molar ratio between the silicon atoms of the organic silicon-containing compound and the epoxy-groups in the coating composition is in the range of 0.25-0.75:1.00.

In a further embodiment, the invention pertains to a coating composition suitable for providing a metallic or concrete surface of a chemical installation with a coating, wherein the coating composition comprises epoxy-functional resin and amine curing agent for the epoxy-functional resin, wherein the coating composition comprises an organic silicon-containing compound selected from the group of organosilanes and organosiloxanes, with the molar ratio between the silicon atoms of the organic silicon-containing compound and the epoxy-groups in the coating composition being in the range of 0.20-0.75:1.00.

In one example, the molar ratio between the silicon atoms of the organic silicon-containing compound and the epoxy-groups in the coating composition is in the range of 0.25-0.75:1.00.

Compositions comprising silicon containing compounds and epoxy-functional resins are known, for example in US 2013/0224496, WO 2013/110046, WO 2004/033570 and US 2013/0237638.

All compositions disclosed in US 2013/0224496, WO 2004/033570 and US 2013/0237638 have a molar ratio of silicon atoms of the organic silicon-containing compound to the epoxy-groups in the coating composition of greater than 0.75:1.00. WO 2013/110046 provides no guidance on the molar ratio of the silicon atoms of the organic silicon-containing compound to the epoxy-groups in the coating composition. None of these documents suggest coating compositions having the molar ratio between the silicon atoms of the organic silicon-containing compound and the epoxy-groups in the coating composition as claimed herein (e.g. 0.20-0.75:1.00), and that such coating compositions would have improved chemical resistance, and other advantageous properties e.g. better overcoatability.

The invention will be described in more detail below.

DETAILED DESCRIPTION

In the present invention, the coating composition comprises epoxy-functional resin, amine curing agent for the epoxy-functional resin and an organic silicon-containing compound selected from the group of organosilanes and organosiloxanes. The organic silicon-containing compound may be one or more compounds selected from the group of epoxy-functional silanes and siloxanes, amino-functional silanes and siloxanes, and organosilanes or organosiloxanes having no epoxy or amine functionality. The coating composition may contain silicon-containing epoxy-resins, namely epoxy-functional silanes and siloxanes, and silicon-free epoxy resins, and silicon-containing amine curing agents, namely amino-functional silanes and siloxanes, and silicon-free amine curing agents. Further, as indicated above, the coating composition may contain organosilanes or organosiloxanes having no epoxy or amine functionality. The coating composition may also contain further components like fillers and pigments.

In the following, the various components of the coating composition will first be discussed. Then, the composition itself will be discussed.

Epoxy-Functional Silanes and Siloxanes

In one embodiment of the present invention, the coating composition comprises at least one epoxy-functional silane or siloxane. Within the context of the present specification, the term epoxy-functional silane refers to monoglycidylalkoxysilanes and epoxy-functional siloxane refers to mono and polyglycidylpolysiloxane compositions comprising any component of the composition containing at least one —Si—O—Si— linkage.

Epoxy-functional silanes and epoxy-functional siloxanes suitable for use in the present invention include those of Formula 1, Q-R$^1$—Si—(OR$^2$)$_n$(R$^3$)$_{2-n}$—O[-(Q-R$^1$)Si(OR$^2$)$_{n-1}$(R$^3$)$_{2-n}$—O—]$_m$R$^2$   Formula 1:

wherein Q represents a glycidoxy group

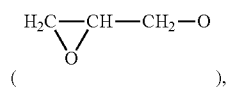
( ),

R$^1$ represents an aliphatic alkyl group with 1-6 carbon atoms, R$^2$ represents an aliphatic monovalent C1-C6 alkyl group, R$^3$ represents an aliphatic monovalent C1-C6 alkyl group or a monovalent C6 aromatic group, n is 1 or 2, and m is an integer greater than or equal to zero.

R$^1$ preferably has 2-4 carbon atoms, more preferably 3. R$^2$ preferably is methyl, ethyl or propyl, more preferably methyl. R$^3$ preferably is an aliphatic C1-C6 alkyl group, more in particular methyl, ethyl or propyl, more preferably methyl or a monovalent C6 aromatic group, preferably phenyl.

When n=2, R$^3$ is non-existent. When m=0, the general formula describes the epoxy-functional silanes. When m>0, the general formula describes the epoxy-functional siloxanes. For the epoxy-siloxanes, m may vary within wide ranges. It is generally preferred for the epoxy-functional silanes used in the present invention to have a number average value for m of at most 10. Suitable epoxy-functional silane or siloxane compounds are known in the art.

In one embodiment, an epoxy-functional silane is used of formula 1 wherein R$^1$=—CH$_2$CH$_2$CH$_2$—, R$^2$=CH$_3$, R$^3$ is non-existent, n=2 and m=0. This compound has the formula

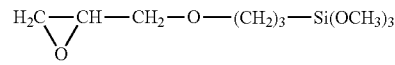

This material is glycidoxypropyl trimethoxysilane (GOPTMS) and for example is available from Evonik (under the trade name Dynasylan GLYMO).

In another embodiment, an epoxy-functional siloxane oligomer is used having an —(Si—O)— backbone and pendant epoxy groups. In one embodiment, an epoxy-functional siloxane oligomer of this type is used which is of formula 1 above, wherein R$^1$=—CH$_2$CH$_2$CH$_2$—, R$^2$=CH$_3$, R$^3$ is non-existent, n=2 and m has a number average value in the range of 2 to 8, in particular 3-5, e.g. around 4. Such a material is manufactured by Momentive Performance Chemicals and sold under the trade name Momentive MP200.

There are many further suitable compounds which may be used, including glycidoxypropyl triethoxysilane (a compound of formula 1 wherein R$^1$=—CH$_2$CH$_2$CH$_2$—, R$^2$=CH$_2$CH$_3$, R$^3$ is non-existent, n=2 and m=0), Silres HP1000 from Wacker, (a compound of formula 1 wherein m=2, n=1, R$^2$=CH$_3$, R$^3$=phenyl), glycidoxypropyl dimethylethoxysilane (a compound of formula 1 wherein R$^1$=—CH$_2$CH$_2$CH$_2$—, R$^2$=CH$_2$CH$_3$, R$^3$=CH$_3$, n=0 and m=0), 3-glycidoxypropyl methyldimethoxysilane (a compound of formula 1 wherein R$^1$=—CH$_2$CH$_2$CH$_2$—, R$^2$=CH$_3$, R$^3$=CH$_3$, n=1 and m=0), 3-glycidoxypropyl methyldiethoxysilane (a compound of formula 1 wherein R$^1$=—CH$_2$CH$_2$CH$_2$—, R$^2$=CH$_2$CH$_3$, R$^3$=CH$_3$, n=1 and m=0).

In one embodiment, one or more of the following epoxy-functional silanes and epoxy-functional siloxanes are used, wherein R$^4$ is a glycidoxy group, e has a value of 0.1 to 0.5, f has a value of 0.1 to 0.5 and g has a value of 0.5 to 0.9:
epoxy-functional silicon materials comprising the units:
(R$^4$(CH$_3$)$_2$SiO$_{1/2}$)$_e$ and (C$_6$H$_5$SiO$_{3/2}$)$_g$
epoxy-functional silicon materials comprising the units:
(R$^4$(CH$_3$)$_2$SiO$_{1/2}$)$_e$, ((CH$_3$)$_2$SiO$_{2/2}$)$_f$ and (C$_6$H$_5$SiO$_{3/2}$)$_g$
epoxy-functional silicon materials comprising the units:
((CH$_3$)$_3$SiO$_{1/2}$)$_e$, (R$^4$(CH$_3$)SiO$_{2/2}$)$_f$ and (C$_6$H$_5$SiO$_{3/2}$)$_g$
epoxy-functional silicon materials comprising the units:
(R$^4$(CH$_3$)SiO$_{2/2}$)$_f$ and (C$_6$H$_5$SiO$_{3/2}$)$_g$
epoxy-functional silicon materials comprising the units:
(R$^4$(CH$_3$)$_2$SiO$_{1/2}$)$_e$, and (CH$_3$SiO$_{3/2}$)$_g$
epoxy-functional silicon materials comprising the units:
(R$^4$(CH$_3$)$_2$SiO$_{1/2}$)$_e$, ((CH$_3$)$_2$SiO$_{2/2}$)$_f$ and (CH$_3$SiO$_{3/2}$)$_g$
epoxy-functional silicon materials comprising the units:
((CH$_3$)$_3$SiO$_{1/2}$)$_e$, (R$^4$(CH$_3$)SiO$_{2/2}$)$_f$ and (CH$_3$SiO$_{3/2}$)$_g$
epoxy-functional silicon materials comprising the units:
(R$^4$(CH$_3$)SiO$_{2/2}$)$_f$ and (CH$_3$SiO$_{3/2}$)$_g$
epoxy-functional silicon materials comprising the units:
((CH$_3$)$_2$SiO$_{2/2}$)$_f$ and (R$^4$SiO$_{3/2}$)$_g$.

Amino-Functional Silanes and Siloxanes

In one embodiment of the present invention, the coating composition comprises at least one amino-functional silane or siloxane. The amino-functional silane or siloxane may be the sole amine curing agent for the epoxy-functional resin, or it may be used in combination with a silicon-free amine curing agent. Suitable amino-functional silanes or siloxanes are known in the art.

Amino-functional silanes and amino-functional siloxanes suitable for use in the present invention include those of Formula 2,

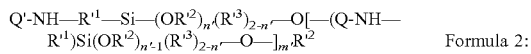   Formula 2:

wherein Q' represents the residue —$(CH_2CH_2NH)_{z'}$—H or an aminoaryl group, $R'^1$ represents an aliphatic alkyl group with 1-6 carbon atoms, $R'^2$ represents an aliphatic monovalent C1-C6 alkyl group, $R'^3$ represents an aliphatic monovalent C1-C6 alkyl group or a monovalent C6 aromatic group, n' is 1 or 2, and m' is an integer greater than or equal to zero. In formula 2, z' has value 0, 1 or 2.

$R'^1$ preferably has 2-4 carbon atoms, more preferably 3. $R'^2$ preferably is methyl, ethyl or propyl, more preferably methyl. $R'^3$ preferably is an aliphatic C1-C6 alkyl group, more in particular methyl, ethyl or propyl, more preferably methyl or a monovalent C6 aromatic group, preferably phenyl.

When n'=2, $R'^3$ is non-existent. When m'=0, the general formula describes the amino-functional silanes. When m'>0, the general formula describes amino-functional siloxanes. For the amino-functional siloxanes, m' may vary within wide ranges. It is generally preferred for the amino-functional silanes used in the present invention to have a number average value for m' of at most 10. Suitable amino-functional silane or siloxane compounds are known in the art.

Examples of suitable amino-functional silanes or siloxanes include aminopropyltriethoxysilane (Q'=—H, $R'^1$=—$CH_2CH_2CH_2$—, $R'^2$=—$OH_2OH_3$, $R'^3$ is non-existent and m'=0 in formula 2), aminopropyltrimethoxysilane (Q'=—H, $R'^1$=—$CH_2CH_2CH_2$—, $R'^2$=—$CH_3$, $R'^3$ is non-existent and m'=0 in formula 2), aminophenyltrimethoxysilane (Q'=—$C_6H_4NH_2$, $R'^1$ is non-existent, $R'^2$=—$CH_3$, $R'^3$ is non-existent and m'=0 in formula 2), N-(2-aminoethyl)-3-aminopropyltriethoxysilane (Q'=—$NHCH_2CH_2NH_2$, $R'^1$=—$CH_2CH_2CH_2$—, $R'^2$=—$OH_2OH_3$, $R'^3$ is non-existent and m'=0 in formula 2), N-(2-aminoethyl)-3-aminopropyl trimethoxy silane (Q'=—$(CH_2CH_2NH)$—H, i.e. z'=1 in formula 2, $R'^1$=—$CH_2CH_2CH_2$—, $R'^2$=—$CH_3$, $R'^3$ is non-existent and m'=0 in formula 2), and (3-trimethoxysilylpropyl) diethylene-triamine (Q'=—$(CH_2CH_2NH)_2$—H, i.e. z'=2 in formula 2, $R'^1$=—$CH_2CH_2CH_2$—, $R'^2$=—$CH_3$, $R'^3$ is non-existent and m'=0 in formula 2).

There are many further suitable compounds which may be used, including Silres HP2000 from Wacker, (a compound of formula 2 wherein m'=2, n'=1, $R'^2$=$CH_3$, $R'^3$=phenyl). This is an example of an amino-siloxane. Amines with alkoxysilane units related to the present invention also include aminoalkyl alkyldialkoxysilanes, aminoalkyl dialkylalkoxysilanes and precondensed aminoalkyl alkoxysilanes.

Organosilanes and Organosiloxanes Having No Epoxy or Amine Functionality

In one embodiment of the present invention, the coating composition comprises at least one organosilane or organosiloxane having no epoxy or amine functionality. In the present specification these compounds may also be indicated as non-functional organosilanes or organosiloxanes. The wording non-functional means that the compound does not contain epoxy groups or amine groups, which could react with, respectively, the amine or epoxy groups present in the composition. Suitable non-functional organosilanes and organosiloxanes are known in the art.

Organosilanes and organosiloxanes having no epoxy or amine functionality suitable for use in the present invention include those of Formula 3,

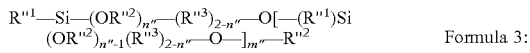   Formula 3:

wherein $R''^1$ represents a saturated or unsaturated aliphatic alkyl group with 1-6 carbon atoms or a monovalent C6 aromatic group, $R''^2$ represents an aliphatic monovalent C1-C6 alkyl group, $R''^3$ represents an aliphatic monovalent C1-C6 alkyl group or a monovalent C6 aromatic group, n" is 1 or 2, and m" is an integer greater than or equal to zero.

When $R''^1$ is non-aromatic, it preferably has 1-4 carbon atoms, more preferably 1 to 3, preferably, methyl, ethyl, vinyl, propyl or allyl. $R''^2$ preferably is methyl, ethyl, or propyl, more preferably methyl. $R''^3$ preferably is an aliphatic C1-C6 alkyl group, more in particular methyl, ethyl, or propyl, more preferably methyl or a monovalent C6 aromatic group, preferably phenyl.

Examples of suitable organosilanes or organosiloxanes having no epoxy or amine functionality are phenyltriethoxysilane, methyltriethoxysilane, phenyltrimethoxysilane, and methyltrimethoxysilane. Further examples include vinyl triethoxysilane, vinyl trimethoxysilane, n-propyl triethoxysilane, n-propyltrimethoxysilane, allyl trimethoxysilane and allyl triethoxysilane. Phenyltriethoxysilane may be considered preferred.

Silicon-Free Epoxy Resins

In one embodiment of the present invention, the coating composition comprises at least one silicon-free epoxy-resin (may also be referred to as a "silicon-free epoxy-functional resin").

Within the context of the present specification, the indication silicon-free epoxy resin refers to a resin or mixture of resins comprising epoxy groups which are free from silane or siloxane groups as described above. Suitable silicon-free epoxy resins are known in the art. They encompass, for example phenol novolac epoxy resins, bisphenol F epoxy resins, and resorcinol diglycidyl ether (RDGE) epoxy resin. Other suitable epoxy resins include diglycidyl ether of bisphenol A, hydrogenated bisphenol A, or bisphenol S, condensed or extended glycidyl ethers of any of the above bisphenols, hydrogenated condensed glycidyl ethers of bisphenols, polyglycidyl ethers of polyhydric alcohols such as trimethylolpropane triglycidyl ether, glycerol triglycidyl ether, pentaerythritol tetraglycidyl ether, dipentaerythritol polyglycidyl ethers, butanediol diglycidyl ether, neopentylglycol diglycidyl ether, hexanediol diglycidyl ether and sorbitol glycidyl ether, epoxidised oils, epoxy compounds like diepoxyoctane and epoxidised polybutadienes.

In one embodiment, the silicon-free epoxy resin comprises an aromatic epoxy resin, in particular a phenol novolac epoxy resin. Suitable phenol novolac epoxy resins are well known in the art, and require no further elucidation. Examples of phenol novolac epoxy resins that can be used in the composition in accordance with the present invention include DEN 425, DEN 431 and DEN 438 (ex DOW Chemicals), Epon 154, Epon 160, Epon 161 and Epon 162 (ex. Momentive Performance Chemicals), and Epalloy 8250 (ex. Emerald Chemical Co.). These epoxy compounds have an epoxy equivalent weight in the range of 165-185 g/eq. The epoxy equivalent weight is the weight of the epoxy resin required to yield one mole (or one equivalent) of epoxy functional groups. Other epoxy resins which may be used comprise epoxy cresol novolac resins, such as Epon 164 and Epon 165 (ex. Momentive Performance Chemicals), or bisphenol A epoxy novolac resins, such as the Epon SU range of resins.

In one embodiment, the silicon-free epoxy resin comprises an RDGE epoxy resin. An RDGE epoxy resin that can be used in the composition in accordance with the present invention is normally a low viscosity epoxy compound with an epoxy equivalent weight of 110-140 g/eq, more preferably 120-135 g/eq.

While RDGE epoxy resins are attractive for manufacturing coatings with a very high chemical resistance, it is sometimes preferred to dispense with the use of RDGE, as this epoxy resin has very severe sensitizing properties. Therefore, in one embodiment the coating composition comprises less than 50 wt. % of RDGE epoxy resin, calculated on the total amount of silicon-free epoxy resin, preferably less than 20 wt. %, more preferably less than 10 wt. % of RDGE, in particular less than 5 wt. % of RDGE, for example less than 2 wt. % of RDGE. It may be preferred for the coating composition to be essentially free from RDGE, which means that no RDGE is intentionally added to the composition.

It is a particular feature of the present invention, and a surprising and unexpected finding, that compositions can be prepared which comprise a relatively low amount of RDGE as described above, or are essentially free from RDGE, while still showing a very good chemical resistance.

Blends of any of the above silicon-free epoxy resins may be used in combination with each other, but the epoxy phenol novolac resins are preferred when very high chemical resistance is required. It is therefore preferred for epoxy phenol novolac resins to make up at least 50% of the silicon-free epoxy resin, calculated on the total of epoxy groups provided by the silicon-free epoxy resin. More preferably, the epoxy phenol novolac resins make up at least 70%, more in particular at least 80% of the silicon-free epoxy resin, calculated on the total of epoxy groups provided by the silicon-free epoxy resin.

In particular, in order to minimize the solvent content of any coating formulation containing the silicon-free epoxy resin, it is preferred that the epoxy phenol novolac, if used, has a low solvent content, e.g., below 20 wt. %, preferably below 10 wt. %, based on the weight of epoxy phenol novolac resin. It is particularly preferred for the epoxy phenol novolac to be free of solvent.

Silicon-Free Amine Curing Agents

The coating composition comprises an epoxy-functional resin (also simply referred to herein an "epoxy resin") and amine curing agent. The amine curing agent may be a silicon-free amine curing agent, a silicon-containing amine curing agent, or a combination of both. Silicon-containing amine curing agents are discussed above in the section on amine-functional silanes and siloxanes. In this section, the silicon-free curing agent will be discussed.

As epoxy resins are electrophilic in nature, they commonly react with nucleophiles. The curing agents used in this invention comprise nucleophilic functional groups, in the present case amine groups, that react with epoxy groups. During the ring-opening reaction of an epoxide with a nucleophile (nucleophilic functional groups), a hydrogen atom is transferred from the nucleophile to the oxygen atom of the epoxide. This transferred hydrogen atom is referred to as the "active hydrogen". The reaction is illustrated:

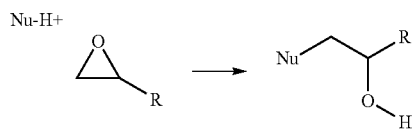

It is common therefore to quote the equivalent weight of the nucleophilic species in terms of the active hydrogen equivalent weight. This is simply the weight of nucleophilic species required to yield one mole (or one "equivalent") of hydrogen atoms transferable to the ring opened epoxy. In the case of an amine curing agent the active hydrogen equivalent weight of the amine curing agent is therefore the weight of the curing agent to give one mole (or one "equivalent") of N—H groups. A primary amine curing agent, for example, would have two active hydrogens as it can react with two epoxide groups.

The silicon-free amine curing agent used in the present invention generally is a polyamine in that it encompasses at least two amine groups. The amine groups can be primary and/or secondary amine groups.

The coating composition of the invention comprises an amine curing agent. Depending on the further components, the amine curing agent may comprise at least one amino-functional silane or siloxane as described above, at least one silicon-free amine curing agent as described in this section, or a combination of at least one amino-functional silane or siloxane with at least one silicon-free amine curing agent.

In one embodiment of the present invention, the coating composition comprises at least one silicon-free amine curing agent. Within the context of the present specification, the indication silicon-free amine curing agent refers to amine curing agents which are free from silane or siloxane groups as described above. Suitable silicon-free amine curing agents resins are known in the art.

Examples of suitable silicon-free polyamine curing agents are ethylene diamine, N-(2-hydroxyethyl)ethylene diamine, diethylene triamine, triethylene tetramine, tetraethylene pentamine, and the curing agents commonly manufactured by reacting these polyamine curing agents with fatty acids and dimer fatty acids, leading to amidoamines and amine functional polyamide curing agents. Examples of such curing agents are described in "Protective Coatings, Fundamentals of Chemistry and Composition", by Clive H. Hare, published by the Society for Protective Coatings (ISBN 0-938477-90-0) and are hereby incorporated by reference. Further polyamine curing agents are dicyandiamide, isophorone diamine, m-xylylene diamine, m-phenylene diamine, 1,3-bis(aminomethyl)cyclohexane, bis(4-aminocyclohexyl) methane, bis(4-amino-3-methylcyclohexyl) methane, N-aminoethyl piperazine, 4,4'-diaminodiphenyl methane, 4,4'-diamino-3,3'-diethyl-diphenyl methane, diaminodiphenyl sulfone, and Mannich base curing agents. Commercial grade quality curing agents of any of these polyamine curing agents may be used, for example Ancamine 2264 (ex. Air Products) is a commercial quality curing agent comprising mainly bis(4-aminocyclohexyl) methane. Examples of amine curing agents are described in "Protective Coatings, Fundamentals of Chemistry and Composition", by Clive H. Hare, published by the Society for Protective Coatings (ISBN 0-938477-90-0), "Epoxy Resins" by H Lee and K Neville, published by LLC (ISBN 978-1258243180), "Resins for Coatings", edited by D Stoye and W Freitag, published by Hanser (ISBN 978-1569902097) and are hereby incorporated by reference.

Adducts of any of these amines can also be used. Such adducts can be prepared by reaction of the amine with a suitably reactive compound such as a silicon-free epoxy resin or an epoxy functional reactive diluent, for example butyl glycidyl ether. This will reduce the free amine content of the curing agent, making it more suitable for use under conditions of low temperature and/or high humidity. Further examples of epoxy-functional reactive diluents are described in "Protective Coatings, Fundamentals of Chemistry and Composition", by Clive H. Hare, published by the Society for Protective Coatings (ISBN 0-938477-90-0) and are hereby incorporated by reference. Adducts of any of these amines can also be prepared by reaction of the amine with a suitably reactive compound such as an acrylate, a maleate, a fumarate, a methacrylate, or even electrophilic vinyl compounds such as acrylonitrile.

Cycloaliphatic amines have been found to give good chemical resistance in the composition of the present invention. Examples of suitable cycloaliphatic amine curing agents include bis(4-aminocyclohexyl) methane as shown below, and isophorone diamine.

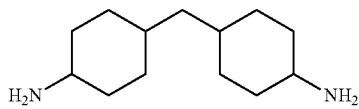 [SMILES: NC1CCC(CC2CCC(N)CC2)CC1]

Mixtures of amine curing agents can also be used, including mixtures of silicon-free amine curing agents and amino-functional silanes and siloxanes.

Further Components

In one embodiment the coating composition comprises an accelerator which speeds up the curing reaction between the epoxy groups of the epoxy-functional resin and the amine groups of the amine curing agent. Whilst the amine groups of the curing agent, either in their unreacted or reacted form, will also accelerate the hydrolysis and condensation reactions of the alkoxysilane groups present on the organosilane or organosiloxane discussed above for use in the present invention, it is also advantageous to add an accelerator which speeds up this process as well. Certain of these accelerators can also promote an anionic polymerisation of the epoxy groups. It is also possible to add accelerators which speed up the hydrolysis and condensation of the alkoxysilane groups, but which do not have a significant impact on the reaction between the amine groups and the epoxy groups or the anionic polymerization of the epoxy groups. Examples of such accelerators are dibutyltin dilaurate, dioctyltin dilaurate, dibutyltin diacetate, bismuth neodecanoate, titanium tetrabutoxide, titanium tetraisopropoxide, poly(n-butyl titanate) and the like. Examples of accelerators known to speed up the curing reaction between an epoxy resin and the amine curing agent include the following: alcohols, phenols, carboxylic acids, sulphonic acids, salts, and tertiary amines:

Alcohols: Examples of suitable alcohols include ethanol, 1-propanol, 2-propanol, 1-butanol, 2-butanol, t-butanol, benzyl alcohol, furfuryl alcohol, and other alkyl alcohols, propanediol, butanediol, glycerol and other polyhydric alcohols, triethanolamine, tri-isopropanolamine, dimethylaminoethanol and other beta-hydroxy tertiary amines.

Phenols: Examples of suitable phenols include phenol, 2-chlorophenol, 4-chlorophenol, 2,4-dichlorophenol, 2,4,6-trichlorophenol, 2-nitrophenol, 4-nitrophenol, 2,4-dinitrophenol, 2,4,6-trinitrophenol, 4-cyanophenol, o-cresol, m-cresol, p-cresol, 4-ethylphenol, 4-isopropylphenol, 2,4-dimethylphenol, 3,5-dimethylphenol, nonyl phenol, eugenol, isoeugenol, cardanol and other alkylated phenols, 2,2'-dihydroxybiphenyl, 2,4'-dihydroxybiphenyl, 4,4'-dihydroxybiphenyl, bisphenol A, bisphenol F, catechol, 4-t-butyl catechol, resorcinol, 4-hexylresorcinol, orcinol, hydroquinone, naphthalenediol, anthracenediol, biphenylenediol and other substituted dihydric phenols, phloroglucinol, phloroglucide, calixarene, poly(4-vinylphenol) and other polyhydric phenols.

Carboxylic acids: Examples of suitable carboxylic acids include acetic acid, propanoic acid, butyric acid, lactic acid, phenyl acetic acid and other alkyl carboxylic acids, malonic acid, oxalic acid, maleic acid, fumaric acid and other dibasic acids or their monoesters, benzoic acid, 4-t-butyl benzoic acid, salicylic acid, 3,5-dichlorosalicylic acid, 4-nitrobenzoic acid and other aromatic acids. Sulphonic acids: Examples of suitable sulphonic acids include methanesulphonic acid and other alkyl sulphonic acids, p-toluenesulphonic acid, 4-dodecylbenzenesulphonic acid, and other aromatic sulphonic acids, naphthalene disulphonic acid, di-nonyl naphthalene disulphonic acid and other polybasic sulphonic acids.

Salts: Examples of suitable salts include calcium nitrate, calcium naphthenate, ammonium thiocyanate, sodium thiocyanate, potassium thiocyanate, imidazolinium thiocyanate, lithium tetrafluoroborate, lithium bromide, lithium trifluoroacetate, calcium chloride, ytterbium triflate, lithium perchlorate, zinc triflate, lithium nitrate. For all these salts, the cation could be interchanged with lithium, sodium or potassium.

In the coating composition of the present invention an anionic polymerisation of the epoxy groups may also occur. In one embodiment, anionic polymerisation of the epoxy groups is accelerated by including an accelerator in the composition. Examples of suitable anionic polymerisation accelerators are tertiary amines, like 1,8-diaza-bicyclo [5.4.0]undec-7-ene, triethylene diamine (diazabicyclooctane), benzyldimethylamine, dimethylaminopropylamine, diethylaminopropylamine, N-methylmorpholine, 3-morpholinopropylamine, triethanolamine, dimethylaminoethanol, 2-dimethylaminomethylphenol, 4-dimethylaminomethylphenol, 2,4-bis(dimethylaminomethyl)phenol, 2,6-bis(dimethylaminomethyl)phenol, and 2,4,6-tris(dimethylaminomethyl)phenol; imidazoles like 1-methylimidazole, 2-methylimidazole, 2-phenylimidazole, 2-phenyl-4-methylimidazole, 2-ethyl-4-methyl imidazole and 2-heptadecylimidazole. These accelerators also speed up the cure between the epoxy groups of the epoxy resins and the functional groups of the curing agent having an active hydrogen.

Preferred accelerators in the context of this application include, tertiary amines, like 1,8-diaza-bicyclo[5.4.0]undec-7-ene, triethylene diamine (diazabicyclooctane), benzyldimethylamine, triethanolamine, dimethylaminoethanol, and 2,4,6-tris-(dimethylaminomethyl)phenol; imidazoles like 1-methylimidazole, 2-methylimidazole, 2-phenylimidazole, 2-phenyl-4-methylimidazole, 2-ethyl-4-methyl imidazole and 2-heptadecylimidazole, optionally in combination with one or more of the other above mentioned catalysts.

The tertiary amine accelerators also function as catalysts for the hydrolysis and condensation of the alkoxysilane groups of the organosilane or organosiloxane discussed above for use in the present invention.

The accelerator(s), if present, are suitably used in an amount of 0.1 to 5.0 parts by weight relative to 100 parts by weight of the epoxy resin mixture, preferably 0.5 to 5.0 parts by weight relative to 100 parts by weight of the epoxy resin mixture.

As will be discussed in more detail below, the coating composition according to the invention is a two-pack composition. The accelerator(s), if present, should be present in the pack containing the amine curing agent. It is not recommended that the accelerator(s) are present in the pack containing the epoxy resin mixture, as this could reduce the shelf life of this pack.

In one embodiment, the coating composition of the invention comprises one or more pigments and/or fillers. The one or more pigments may be colouring pigments for example titanium dioxide (white pigment), coloured pigments such as yellow or red iron oxide or a phthalocyanine pigment. The one or more pigments may be strengthening pigments such as micaceous iron oxide, crystalline silica and wollastonite. The one or more pigments may be anticorrosive pigments such as zinc phosphate, molybdate or phosphonate. The one or more pigments may be a filler pigment such as barytes, talc, feldspar, or calcium carbonate.

The composition may contain one or more further ingredients, for example a thickening agent or thixotrope such as fine-particle silica, bentonite clay, hydrogenated castor oil, or a polyamide wax. The composition may also contain a plasticiser, pigment dispersant, stabiliser, flow aid, wetting agent, defoamer, adhesion promotor, or thinning solvent. In one embodiment, the coating composition used in the present invention has a solvent content of at most 250 g/l, in particular at most 200 g/l, more in particular at most 150 g/l, still more in particular at most 100 g/l. It may be preferred for the solvent content to be at most 50 g/l. In one embodiment, the composition has no added solvent.

Solvent content may be determined as follows: The solvent content comprises those ingredients which are liquid at 0-50° C., which are not reactive with the epoxy resin, the amine curing agent, and the organosilane and organosiloxane discussed above for use in the present invention, and which possess a vapour pressure of more than 0.01 kPa at 25° C. or a boiling point of below 250° C. at 1 atmosphere pressure. For the purposes of clarity, any volatile material according to the above definition produced by the hydrolysis of the epoxy-functional silane or the epoxy functional siloxane, or any other alkoxysilane present in the coating composition is not included in the solvent content.

The Coating—Application and Use

The coating composition of the present invention is capable of at least partially curing the epoxy-functional resin at a temperature in the range of 0 to 50° C. If this requirement is not met, the composition is less suitable for coating metallic or concrete surfaces in a chemical installation. It is a feature of the method according to the invention that the coating is cured in a first step at a temperature in the range of 0 to 50° C., e.g. 10-30° C., more in particular 15-25° C. In this step, curing should take place at least to the extent that water can be subsequently sprayed on to the coating or the coating can be physically handled without disrupting the coating surface. This step will be further indicated as the ambient curing step. The ambient curing step can, e.g., be carried out for a time of 1 to 24 hours, in particular 3 to 10 hours, wherein higher temperatures will reduce the required curing time and wherein lower temperatures will increase the required curing time.

It may be preferred for the ambient curing step to be carried out in the relative humidity range of 0-100%, more preferably in the range 20-80%, most preferably in the range 40-60%. Where the surface to be coated is relatively enclosed, e.g., where it is part of a tank, it is common practice to control the relative humidity during the coating operations, to ensure film formation takes place to deliver an integral coating, free from significant defects.

Often, in order to deliver a coating with the optimum chemical resistance performance, it is advantageous to further cure the coating composition in a second step, particularly where the coating will come into contact with very aggressive chemicals. In this second step, which will also be indicated as post-curing step, the coating layer is heated to a temperature above 50° C. for a given time, e.g., for a period of, e.g., 1 to 24 hours, in particular 3 to 16 hours. In general, post-curing can take place at a temperature of at least 50° C., e.g., 50-150° C. In one embodiment, post-curing will take place at a temperature of 50-100° C., e.g., 50-80° C. In another embodiment, post-curing will take place at a temperature of 100-150° C.

How post-curing is effected will depend on the nature of the surface to be coated, and will be evident to the person skilled in the art. For example, curing can be effected by heating the surface with hot air or hot water, e.g., by spraying. Where the chemical installation is a tank, heating can also be effected by, e.g., contacting the coated surface with hot cargo, using the heat from the cargo to effect the additional curing, or filling the tank with hot water. The performance of a post-curing step at a temperature of at least 50° C. is a preferred embodiment of the present invention.

The coating composition can be applied to the surface to be coated by methods known in the art. Examples of suitable methods include rolling, spraying, and brushing. Application by spraying is preferred, as it leads to efficient deposition of a homogeneous coating layer. It is a feature of the present invention that the coating composition can be formulated to have a sprayable viscosity without having to resort to substantial amounts of solvents. The composition may, e.g., be applied through single feed airless spray technology, or via plural component application technology.

Each coating layer applied in the present invention may have a thickness after curing of, e.g., 50 to 350 micron, in particular 75 to 200 micron. This thickness applies to each layer, irrespective of whether they are cured individually after application, or at the same time.

The present invention pertains to the coating of the metallic or concrete surface of a chemical installation. In the context of the present specification "Chemical installation" means buildings, man-made structures and/or equipment that are used to produce and/or store and/or transport liquid or gaseous bulk chemicals. Specific examples of chemical installations includes buildings, man-made structures and/or equipment in both existing and new chemical installations for the shipping or marine industry, oil and gas industry, the chemical processing industry, the power industry, the waste and water industry, the transportation industry, and the mining and metals industry.

Bulk chemicals refers to chemicals which are present in bulk, i.e., in a volume of at least 10 m$^3$. Bulk chemicals vary from being completely harmless to very aggressive to steel, concrete and or other materials. Liquid bulk chemicals can be broadly categorized into edible and non-edible commodities. Examples of edible liquid bulk chemical cargos are fruit juices, milk and vegetable oils, while examples of non-edible bulk chemicals include chemical solvents, reactive chemical intermediates such as vinyl acetate, petroleum, acids, alkalis and liquefied natural gas (LNG).

The metallic or concrete surface may comprise both the internal and external surfaces of storage tanks, storage vessels, their associated pipework or other pipework in general, flues and containment areas. In addition to the liquid or gaseous chemicals, such metal or concrete surfaces in chemical installations may be exposed to high temperatures, whether static or cycled, and also high pressures, whether static or cycled.

In one embodiment, the chemical installation coated in the present invention is a chimney, pipe, or tank, e.g., a cargo or storage tank.

It has been found that the coating composition according to the present invention shows particularly good results as a tank lining composition, combining a low absorption for a wide variety of chemicals with a good washability, resulting in the coating composition being able to withstand cyclic loading with various types of bulk chemicals. It has further been found that the coating composition has a good thermal stability at elevated temperature, which makes it suitable for use in storage tanks on land, where high temperature may be an issue. The present invention is of particular use in and for cargo tanks, but also for further tanks, such as land based storage tanks for a variety of chemicals and crude oil or hydrocarbon-water mixtures, and secondary containment areas for these tanks.

The coating composition can be applied directly to surface as a primer/finish, i.e. the composition can be used as the only type of protective coating on a surface. It is also possible to apply the coating composition according to the invention as a primer, i.e., to first apply the coating of the invention on the surface to form a first coating layer, cure the coating layer at a temperature of 0-50° C., provide a further coating onto the first coating layer to form a second coating layer, and cure the second coating layer. The application of further coating layers is also possible, to provide three or more layers of the coating composition of the invention. Usually no more than three layers are required, with the precise number being dependent on the thickness of the individual layers. If a post-curing step is carried out, it is preferred for this to be carried out after all layers have been deposited.

The Coating—Composition

The coating composition is a two-pack coating composition wherein the first pack comprises the components containing epoxy groups and the second pack comprises components which are reactive with the epoxy groups, such as the compounds comprising amine groups. The use of a two-pack composition will allow curing at a temperature of 0-50° C.

The coating composition comprises epoxy-functional resin, amine curing agent for the epoxy-functional resin, and an organic silicon-containing compound selected from the group of organosilanes and organosiloxanes, with the molar ratio between the silicon atoms of the organic silicon-containing compound and the epoxy-groups in the coating composition being in the range of 0.20-0.75:1.00, for example in the range of 0.25-0.75:1.00. As indicated above, the organic silicon-containing compound generally comprises an epoxy-functional silane or epoxy-functional siloxane, an amino-functional silane or amino-functional siloxane, and/or a organosilane or organosiloxane having no epoxy or amine functionality.

It has been found that if the molar ratio between the silicon atoms of the organic silicon-containing compound and the epoxy-groups in the coating composition is not within the stipulated range of 0.20-0.75:1.00, the chemical resistance properties of the coating composition will not be sufficient.

The preferred molar ratio between the silicon atoms of the organic silicon-containing compound and the epoxy-groups in the coating composition is within the stipulated range of 0.25-0.75:1.00. More specifically, if the molar ratio between the silicon atoms of the organic silicon-containing compound and the epoxy-groups in the coating composition is too small, the chemical resistance and high-temperature resistance of the coating composition is deleteriously affected. On the other hand, if the molar ratio between the silicon atoms of the organic silicon-containing compound and the epoxy-groups in the coating composition is too high, the coating may fail as a result of cracking, and the chemical resistance to chemicals such as methanol or some concentrated caustic solutions may be compromised. Optionally, the molar ratio between the silicon atoms of the organic silicon-containing compound and the epoxy-groups in the coating composition may be in the range of 0.21-0.75:1.00, 0.22-0.75:1.00, 0.23-0.75:1.00, 0.24-0.75:1.00, 0.30-0.70:1.00, or 0.40-0.60:1.00.

In one embodiment of the present invention, the amount of curing agent present in the coating composition is such that the equivalent ratio of the active hydrogens in the curing agent to the epoxy groups of the epoxy-functional resin(s) is between about 0.15 and 1.80:1.00. This ratio of active hydrogen to epoxy groups enables efficient curing of the coating composition according to the invention. In calculating this ratio, the term epoxy resin encompasses both silicon-containing epoxy resins (i.e. epoxy-functional silanes and siloxanes) and silicon-free epoxy resins. The term active hydrogens in the curing agent encompasses both active hydrogens derived from silicon-free amine curing agent and from silicon-containing amine curing agent (i.e. amino-functional silanes and amino-functional siloxanes).

In one embodiment of the present invention, the equivalent ratio of the active hydrogens in the curing agent to the epoxy groups of the epoxy resins is between about 0.70 and 1.30:1.00, more in particular between 0.85 and 1.10:1.00. In this embodiment, in order to achieve the highest chemical resistance, it is preferred to carry out both an ambient curing step and a post-curing step, as discussed above.

In a further embodiment of the present invention, the equivalent ratio of the active hydrogens in the curing agent to the epoxy groups of the epoxy resins is between about 0.15 and 0.50:1.00, more in particular between 0.20 and 0.40:1.00. In this embodiment, in order to achieve the state of highest chemical resistance, it is preferred to carry out both an ambient curing step and a post-curing step, as discussed above. It is also preferred in this embodiment for the coating composition to comprise a tertiary amine accelerator as discussed above, e.g., in an amount of 0.10 to 5 parts by weight relative to 100 parts by weight of the epoxy resin, more specifically in an amount of 2-5 parts by weight relative to 100 parts by weight of the epoxy resin (including both silicon-free epoxy resin and silicon-containing epoxy resin). This ensures that the epoxy-amine curing reaction is accompanied by the necessary amount of both anionic epoxy homopolymerisation and hydrolysis and self-condensation of the alkoxysilane groups.

In another embodiment, the equivalent ratio of the active hydrogens in the curing agent to the epoxy groups of the epoxy resins is between about 1.20 and 1.80:1.00, more in particular between 1.50 and 1.80:1.00. In this embodiment only an ambient curing step is required.

Selecting the equivalent/mole ratio of epoxy:active hydrogen to be in the stipulated range ensures that the coating composition is able to dry and harden due to the cure of the epoxy and amine groups and the hydrolysis and self-condensation of the alkoxysilane groups of the organosilane or organosiloxane as discussed above for use in the present invention under ambient conditions (e.g. 0° C.-50° C.) to the extent that water can be subsequently sprayed on to the coating or the coating can be physically handled without disrupting the coating surface.

It should be noted that some of the end-point values of the ranges quoted herein are quoted to two-decimal places (e.g. molar ratio between the silicon atoms of the organic silicon-containing compound and the epoxy-groups in the coating composition). These ranges are intended to include values that when rounded up and down to two decimal places in accordance with the usual rounding-up/down rules of mathematics fall within the ranges as quoted (including the end-point values of the ranges). For example, the range 0.25-0.75 includes the values of 0.245 and 0.754, as these values would, if rounded up and down to 2 decimal points in accordance with usual mathematical rules, equal 0.25 and 0.75. On the other hand, a value of 0.244 would round down to 0.24 and would be lower than the lower limit of 0.25 and be outside the range. Similarly, the value of 0.755 would round up to 0.76 and be above the upper limit of 0.75 and would be outside the range.

The same mathematical rules of rounding apply to the other values quoted herein.

The coating composition comprises epoxy-functional resin, amine curing agent for the epoxy resin, and an organic silicon-containing compound selected from the group of organosilanes and organosiloxanes. As discussed above, the organic silicon-containing compound generally comprises one or more of epoxy-functional silane, epoxy-functional siloxane, amino-functional silane or amino-functional siloxane, organosilane having no epoxy or amine fuctionality and organosiloxane having no epoxy or amine fuctionality.

In one embodiment, the coating composition comprises a silicon-free epoxy-resin, an amine curing agent, and an epoxy-functional organosilane or siloxane. In this embodiment the amine curing agent preferably is an silicon-free amine curing agent. For the nature of the various components reference is made to what is stated above. For further components of the coating composition reference is also made to what is stated above.

In this embodiment it has been found that the properties of the coating are particularly good if the epoxy-functional silane or siloxane provides 25-60% of the epoxy-groups present in the coating composition and the silicon-free epoxy resin provides 40-75% of the epoxy-groups present in the coating composition. In one embodiment the epoxy-functional silane or siloxane provides 30-60%, in particular 40-60%, more particularly 45-55%, of the epoxy-groups present in the system. It may also be preferred for the silicon-free epoxy-resin to provide 40-75%, in particular 40-60%, more particularly 45-55%, of the epoxy-groups present in the system. It has been found that this embodiment gives excellent broad spectrum chemical resistance, especially when an additional higher temperature curing stage is applied, as will be discussed in more detail below. In another embodiment, the epoxy-functional silane or siloxane provides 25-50%, in particular 25-35%, of the epoxy-groups present in the system. It may also be preferred for a silicon-free epoxy-resin to provide 50-75%, in particular 65-75% of the epoxy-groups present in the system. It has been found that this embodiment gives excellent dry heat resistance without the need for a specific additional high temperature curing stage prior to entry into service. In one embodiment of the present invention the coating composition comprises a silicon-free epoxy-resin, an amine curing agent, and an epoxy-functional organosilane or siloxane, wherein the epoxy-functional silane or siloxane provides 30-60%, in particular 40-60%, more particularly 45-55%, of the epoxy-groups present in the system, while a silicon-free epoxy-resin provides 40-75%, in particular 40-60%, more particularly 45-55%, of the epoxy-groups present in the system and the equivalent ratio of the active hydrogens in the curing agent to the epoxy groups of the epoxy resins is between about 0.70 and 1.30, more in particular between 0.85 and 1.10. In this embodiment, in order to achieve the highest chemical resistance, it is preferred to carry out both an ambient curing step and a post-curing step, as discussed above. The silicon-free epoxy resin preferably is a novolac resin. The curing agent preferably is a silicon-free amine curing agent, in particular a cycloaliphatic amine curing agent. The composition preferably contains a low amount, or no RDGE as specified above. The preferred epoxy-functional silane is glycidoxypropyl trimethoxysilane (GOPTMS). The preferred epoxy-functional siloxane is an epoxy-functional siloxane oligomer of formula 1 above, wherein $R^1$=—$CH_2CH_2CH_2$—, $R^2$=$CH_3$, $R^3$ is non-existent, n=2 and m has a value in the range of 2 to 8, in particular 3-5, e.g. around 4. Such a material is manufactured by Momentive Performance Chemicals and sold under the trade name Momentive MP200.

In another embodiment, the coating composition comprises a silicon-free epoxy-resin, an amine curing agent, and an epoxy-functional organosilane or siloxane, wherein the epoxy-functional silane or siloxane provides 25-50%, in particular 25-35%, of the epoxy-groups present in the system while a silicon-free epoxy-resin provides 50-75%, in particular 65-75% of the epoxy-groups present in the system, and the equivalent ratio of the active hydrogens in the curing agent to the epoxy groups of the epoxy resins is between about 1.20 and 1.80, more in particular between 1.50 and 1.80. In this embodiment a post-curing step can be dispensed with. The silicon-free epoxy resin preferably is a bisphenol F epoxy resin or an epoxy phenol novolac resin. The curing agent preferably is a silicon-free amine curing agent, in particular a cycloaliphatic amine curing agent. The composition preferably contains a low amount, or no RDGE as specified above. The preferred epoxy-functional silane is glycidoxypropyl trimethoxysilane (GOPTMS).

In one embodiment of the present invention, the coating composition comprises an epoxy-resin, an amine-functional organosilane or siloxane, and optionally a silicon-free amine curing agent. For the nature of the various components reference is made to what is stated above. For further components of the coating composition reference is also made to what is stated above.

As discussed above, the coating composition according to the invention comprises an organic silicon-containing compound selected from the group of organosilanes and organosiloxanes. The organosilanes and organosiloxanes can comprise epoxy-functional silanes or siloxanes, amino-functional silanes or siloxanes, and/or organosilanes or organosiloxanes having no epoxy or amine functionality.

In one embodiment it is preferred for at least part of the silicon atoms of the organic silicon-containing compound present in the coating composition to be derived from epoxy-functional silanes or siloxanes and/or amino-functional silanes or siloxanes rather than from non-functional silanes or siloxanes (i.e. silanes or siloxanes having no epoxy or amine functionality). It is believed that in this way the bonding of the silicon in the organic network of the coating, and therewith the chemical resistance of the coating composition, will be improved.

In one embodiment, of the silicon atoms of organosilanes and organosiloxanes at most 80% is derived from non-functional organosilanes or non-functional organosiloxanes. It may be preferred for at most 60% of the silicon atoms of organosilanes and organosiloxanes to be derived from non-functional organosilanes or non-functional organosiloxanes, more in particular at most 40%, still more in particular at most 20%.

In one embodiment it is preferred for at least part of the silicon atoms of the organic silicon-containing compound present in the coating composition to be derived from epoxy-functional silanes or epoxy-functional siloxanes. It has been found that the use of epoxy-functional silanes or epoxy-functional siloxanes is an efficient way to incorporate relatively large amounts of silicon in the coating composition. In one embodiment, of the silicon atoms of organosilanes and organosiloxanes at least 20% is derived from epoxy-functional silanes or epoxy-functional siloxanes. It may be preferred for at least 40% of the silicon atoms of organosilanes and organosiloxanes to be derived from epoxy-functional silanes or epoxy-functional siloxanes, or at least 60%, or at least 80%.

In one embodiment, the coating composition comprises the combination of non-functional organosilanes or organosiloxanes with epoxy- or amino-functional silanes or siloxanes. This allows the silicon content to be varied independently of the epoxy and amine content, and gives more control of the silicon to epoxy ratio, which is a key feature in controlling the chemical resistance of the coating composition. Therefore, in one embodiment part, e.g., 1-50%, in particular 1-20%, more specifically 5-20 wt. % of the silicon atoms of the organic silicon-containing compound present in the coating composition is derived from organosilanes or siloxanes having no epoxy or amine functionality, while part, e.g., 50-99%, in particular 80-99%, more in particular 80-95% of the silicon atoms of the organic silicon-containing compound present in the coating composition is derived from epoxy-functional silanes or siloxanes and/or amino-functional silanes or siloxanes.

In this embodiment it may be preferred for at least 40% of the silicon atoms of epoxy- or amino-functional organosilanes and organosiloxanes to be derived from epoxy-functional silanes or epoxy-functional siloxanes, or at least 60%, or at least 80%.

In one embodiment, the coating composition comprises the combination of amino-functional organosilanes or organosiloxanes with epoxy-functional silanes or siloxanes. This allows the silicon content to be varied independently of the epoxy content, and gives more control of the silicon to epoxy ratio, which is a key feature in controlling the chemical resistance of the coating composition. Therefore, in one embodiment part, e.g., 1-99%, in particular 10-90%, of the silicon atoms of the organic silicon-containing compound present in the coating composition is derived from amino-functional silanes or siloxanes, while part, e.g., 1-99%, in particular 10-90%, of the silicon atoms of the organic silicon-containing compound present in the coating composition being derived from epoxy-functional silanes or siloxanes.

In one embodiment the coating composition comprises silicon-free epoxy-resin, amine-functional organosilane or siloxane, and optionally silicon-free amine curing agent. For the nature of the various components and their ratios reference is made to what is stated above. For further components of the coating composition reference is also made to what is stated above.

In one embodiment the coating composition comprises silicon-free epoxy-resin, epoxy-functional organosilane or siloxane, amino-functional organosilane or siloxane, and optionally silicon-free amine curing agent. For the nature of the various components and their ratios reference is made to what is stated above. For further components of the coating composition reference is also made to what is stated above.

In one embodiment the coating composition comprises silicon-free epoxy-resin, epoxy-functional organosilane or siloxane, non-functional organosilane or siloxane, and silicon-free amine curing agent. For the nature of the various components and their ratios reference is made to what is stated above. For further components of the coating composition reference is also made to what is stated above.

The coating composition may be manufactured by methods known in the art, which require no further elucidation here. It is within the scope of the skilled person to manufacture coating compositions based on the guidelines above.

It is noted that the embodiments of coating composition described herein may be combined with each other in manners clear to the skilled person. This applies to all properties and compositions, including preferences for various components and ratios between the various components. All embodiments and properties described for the coating are also applicable to the method for providing a tank with a tank lining, and to the tank provided with a lining of the cured coating composition.

Unless indicated otherwise, the specification of the various types of components also applies to coating compositions comprising these components.

The headings in the present specification are for elucidation only, and should not be considered limiting in any way.

The invention will now be elucidated with reference to the following examples.

These are intended to illustrate the invention but are not to be construed as limiting in any manner the scope thereof.

Example 1: Example According to the Invention—Epoxy-Functional Silane with Silicon-Free Epoxy Resin and Amine Curing Agent This example according to the invention shows the effect of mixing an epoxy-functional silane with a silicon-free epoxy resin on the % mass uptake of vinyl acetate and dichloroethane without adding any resorcinol diglycidyl ether. Glycidoxypropyl trimethoxysilane (5.456 g, 0.0231 eq. epoxy) was added to DEN 431 (ex. Dow Chemicals) (4.0513 g, 0.0231 eq. epoxy) and thoroughly mixed at room temperature with a mixture of 2.2202 g bis(4-aminocyclohexyl) methane (PACM) (0.0423 eq. N—H) and tris(2,4,6-dimethylaminomethyl)phenol (0.2448 g). In this composition the molar ratio of silicon atoms of the organosilane to the epoxy groups in the composition is 0.50:1.00. The equivalent ratio of active hydrogens to epoxy groups was 0.92:1.00.

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
| --- | --- |
| Vinyl acetate | 1.47 |
| 1,2-Dichloroethane | 2.07 |

Example 2: Example According to the Invention: Epoxy-Functional Siloxane with Silicon-Free Epoxy Resin and Amine Curing Agent This example shows the effect of mixing an epoxy-functional siloxane with a silicon-free epoxy resin on the % mass uptake of vinyl acetate and dichloroethane without adding any resorcinol diglycidyl ether.

Momentive MP200 (6.6 g, 0.0327 eq. epoxy) was added to DEN 431 (ex. Dow Chemicals) (5.8 g, 0.03295 eq. epoxy) and thoroughly mixed at room temperature with a mixture of 3.12 g bis(4-aminocyclohexyl) methane (PACM) (0.05943 eq. N—H), 1-methylimidazole (0.510 g) and 2-ethyl-4-methylimidazole (0.3136 g).

In this composition the molar ratio of silicon atoms of the organosiloxane to the epoxy groups in the composition is 0.50:1.00. The equivalent ratio of active hydrogens to epoxy groups was 0.91:1.00.

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
| --- | --- |
| Vinyl acetate | 1.98 |
| 1,2-Dichloroethane | 3.39 |

Example 3: Example According to the Invention: Epoxy-Functional Siloxane with Silicon-Free Epoxy Resin and Amine Curing Agent This example shows the effect of mixing an epoxy-functional siloxane with a silicon-free epoxy resin on the % mass uptake of vinyl acetate and dichloroethane without adding any resorcinol diglycidyl ether.

Momentive MP200 (1.622 g, 0.00803 eq. epoxy) was added to DEN 431 (ex. Dow Chemicals) (1.419 g, 0.00809 eq. epoxy) and thoroughly mixed at room temperature with a mixture of 0.3557 g triethylenetetramine (0.0145 eq. N—H), and 2,4,6-tris(dimethylaminomethyl)phenol (0.077 g).

In this composition the molar ratio of silicon atoms of the organosiloxane to the epoxy groups in the composition is 0.50:1.00. The equivalent ratio of active hydrogens to epoxy groups was 0.90:1.00.

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
| --- | --- |
| Vinyl acetate | 4.50 |
| 1,2-Dichloroethane | 3.00 |

Example 4: Example According to the Invention: Epoxy-Functional Silane with Silicon-Free Epoxy Resin and Amine Curing Agent This example shows the effect of mixing an epoxy-functional silane with a silicon-free epoxy resin on the % mass uptake of vinyl acetate and dichloroethane in a pigmented formulation.

A paint base according to the present invention was manufactured and comprised

| INGREDIENT | % WEIGHT |
| --- | --- |
| Glycidoxypropyl trimethoxysilane | 28.8 |
| DEN 431 | 21.4 |
| Nepheline syenite | 41.3 |
| Titanium dioxide | 6.9 |
| Yellow iron oxide | 0.9 |
| Polyamide wax thixotrope | 0.7 |

5 g of this base (0.01218 eq. epoxy) thoroughly mixed at room temperature with a mixture of 0.5924 g Ancamine 2264 (0.011 eq. N—H), 0.0808 g 2,4,6-tris(dimethylaminomethyl)phenol.

In this composition the molar ratio of silicon atoms of the organosilane to the epoxy groups in the composition is 0.50:1.00. The equivalent ratio of active hydrogens to epoxy groups was 0.90:1.00.

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
| --- | --- |
| Vinyl acetate | 1.07 |
| 1,2-Dichloroethane | 1.60 |

Example 5: Example According to the Invention: Epoxy-Functional Silane, Silicon-Free Epoxy Resin, Aminofunctional Silane, and Silicon-Free Amine Curing Agent This example shows the effect of combining both an epoxy-functional silane and an amino-functional silane with a silicon-free epoxy resin on the % mass uptake of vinyl acetate and dichloroethane in an unpigmented formulation, without adding any resorcinol diglycidyl ether.

Glycidoxypropyl trimethoxysilane (2.0163 g, 0.00854 eq. epoxy) was added to DEN 431 (ex. Dow Chemicals) (5.9807 g, 0.0342 eq. epoxy) and thoroughly mixed at room temperature with a mixture of 3.4466 g aminopropyl trimethoxysilane (0.0384 eq. N—H) and 0.2265 g 2,4,6-tris(dimethylaminomethyl)phenol.

In this composition the molar ratio of silicon atoms of the organosilanes to the epoxy groups in the composition is 0.65:1.00. The equivalent ratio of active hydrogens to epoxy groups was 0.90:1.00

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 30 days immersion at room temperature.

| Immersion liquid | % Uptake |
| --- | --- |
| Vinyl acetate | 0.6 |
| 1,2-Dichloroethane | 2.3 |

Example 6: Example According to the Invention: Epoxy-Functional Silane, Aminofunctional Silane, Silicon-Free Epoxy Resin, and Silicon-Free Amine Curing Agent This example shows the effect of combining both an epoxy-functional silane and an amino-functional silane with a silicon-free epoxy resin on the % mass uptake of vinyl acetate and dichloroethane in an unpigmented formulation, without adding any resorcinol diglycidyl ether.

Glycidoxypropyl trimethoxysilane (2.019 g, 0.00854 eq. epoxy) was added to DEN 431 (ex. Dow Chemicals) (5.9807 g, 0.0342 eq. epoxy) and thoroughly mixed at room temperature with a mixture of 0.7659 g aminopropyl trimethoxysilane (0.00854 eq. N—H), 1.5849 g bis(4-aminocyclohexyl)methane (0.0299 eq. N—H) and 0.2265 g 2,4,6-tris(dimethylaminomethyl)phenol.

In this composition the molar ratio of silicon atoms of the organosilanes to the epoxy groups in the composition is 0.30:1.00. The equivalent ratio of active hydrogens to epoxy groups was 0.90:1.00

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places.

The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 23 days immersion at room temperature.

| Immersion liquid | % Uptake |
| --- | --- |
| Vinyl acetate | 2.2 |
| 1,2-Dichloroethane | 2.3 |

Example 7: Example According to the Invention: Epoxy-Functional Silane, Aminofunctional Silane, Silicon-Free Epoxy Resin, and Silicon-Free Amine Curing Agent This example shows the effect of combining both an epoxy-functional silane and an amino-functional silane with a silicon-free epoxy resin on the % mass uptake of vinyl acetate and dichloroethane in an unpigmented formulation, without adding any resorcinol diglycidyl ether.

Glycidoxypropyl trimethoxysilane (2.02 g, 0.00855 eq. epoxy) was added to DEN 431 (ex. Dow Chemicals) (6.017 g, 0.0344 eq. epoxy) and thoroughly mixed at room temperature with a mixture of 4.054 g bis(trimethoxysilylpropyl)amine (Dynasylan 1124, 0.01187 eq. N—H), 1.4204 g bis(4-aminocyclohexyl)methane (0.0268 eq. N—H) and 0.2423 g 2,4,6-tris(dimethylaminomethyl)phenol.

In this composition the molar ratio of silicon atoms of the organosilanes to the epoxy groups in the composition is 0.752:1.00. The equivalent ratio of active hydrogens to epoxy groups was 0.90:1.00

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 23 days immersion at room temperature.

| Immersion liquid | % Uptake |
| --- | --- |
| Vinyl acetate | 1.6 |
| 1,2-Dichloroethane | 1.8 |

Example 8: Example According to the Invention: Amino-Functional Silane, Non-Functional Silane, Silicon-Free Epoxy Resin, and Silicon-Free Amine Curing Agent This example shows the effect of combining both an amino-functional silane and a non-functional silane with a silicon-free epoxy resin on the % mass uptake of vinyl acetate and dichloroethane in an unpigmented formulation, without adding any resorcinol diglycidyl ether.

Phenyl trimethoxysilane (0.5219 g) was added to DEN 431 (ex. Dow Chemicals) (4.037 g, 0.0228 eq. epoxy) and thoroughly mixed at room temperature with a mixture of 1.512 g aminoethylaminopropyl trimethoxysilane (0.0205 eq. N—H) and 0.1321 g 2,4,6-tris(dimethylaminomethyl)phenol.

In this composition the molar ratio of silicon atoms of the organosilanes to the epoxy groups in the composition is 0.40:1.00. The equivalent ratio of active hydrogens to epoxy groups was 0.90:1.00.

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places.

Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
| --- | --- |
| Vinyl acetate | 1.34 |
| 1,2-Dichloroethane | 1.50 |

Example 9: Example According to the Invention: Epoxy-Functional Siloxane, Amino-Functional Silane, Silicon-Free Epoxy Resin, and Silicon-Free Amine Curing Agent This example shows the effect of combining both an epoxy-functional siloxane and an amino-functional silane with a silicon-free epoxy resin on the % mass uptake of vinyl acetate and dichloroethane in an unpigmented formulation, without adding any resorcinol diglycidyl ether.

Momentive MP200 (0.874 g, 0.00433 eq. epoxy) was added to DEN 431 (ex. Dow Chemicals) (3.059 g, 0.0174 eq. epoxy) and thoroughly mixed at room temperature with a mixture of 0.3917 g aminopropyl trimethoxysilane (0.00437 eq. N—H), 0.6515 g isophoronediamine (0.0153 eq. N—H) and 2,4,6-tris(dimethylaminomethyl)phenol (0.1448 g).

In this composition the molar ratio of silicon atoms of the organosilane and the organosiloxane to the epoxy groups in the composition is 0.30:1.00. The equivalent ratio of active hydrogens to epoxy groups was 0.90:1.00.

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
|---|---|
| Vinyl acetate | 1.10 |
| 1,2-Dichloroethane | 2.25 |

Example 10: Example According to the Invention: Epoxy-Functional Silane, Amino-Functional Silane, Silicon-Free Epoxy Resin, and Silicon-Free Amine Curing Agent This example shows the effect of combining both an epoxy-functional silane and an amino-functional silane with a silicon-free epoxy resin on the % mass uptake of vinyl acetate and dichloroethane in an unpigmented formulation, without adding any resorcinol diglycidyl ether.

Glycidoxypropyl trimethoxysilane (1.006 g, 0.00426 eq. epoxy) was added to DEN 431 (ex. Dow Chemicals) (2.9787 g, 0.0170 eq. epoxy) and thoroughly and thoroughly mixed at room temperature with a mixture of 0.0906 g isophoronediamine (0.00213 eq. N—H), 0.1907 g aminopropyl trimethoxy silane (0.00213 eq. N—H) and 0.1692 g 2,4,6-tris(dimethylaminomethyl)phenol.

In this composition the molar ratio of silicon atoms of the organosilanes to the epoxy groups in the composition is 0.25:1.00. The equivalent ratio of active hydrogens to epoxy groups was 0.20:1.00.

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was $$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
|---|---|
| Vinyl acetate | 0.8 |
| 1,2-Dichloroethane | 1.2 |

Example 11: Example According to the Invention: Epoxy-Functional Silane, Amino-Functional Silane, Silicon-Free Epoxy Resin, and Silicon-Free Amine Curing Agent This example shows the effect of mixing combining both an epoxy-functional silane and an amino-functional silane with a silicon-free epoxy resin on the % mass uptake of vinyl acetate and dichloroethane in a pigmented formulation. To the paint base of Example 4, was added 0.5348 g DEN 431 to yield a modified paint base of the following composition:

| INGREDIENT | % WEIGHT |
|---|---|
| Glycidoxypropyl trimethoxysilane | 26.02 |
| DEN 431 | 29.00 |
| Nepheline syenite | 37.31 |
| Titanium dioxide | 6.23 |
| Yellow iron oxide | 0.81 |
| Polyamide wax thixotrope | 0.63 |

5 g of this base (0.0138 eq. epoxy) thoroughly mixed at room temperature with a mixture of 0.0956 g aminopropyl trimethoxysilane (0.00107 eq N—H), 0.107 g Ancamine 2264 (0.00198 eq. N—H), 0.1212 g 2,4,6-tris(dimethylaminomethyl)phenol.

In this composition the molar ratio of silicon atoms of the organosilane to the epoxy groups in the composition is 0.43:1.00. The equivalent ratio of active hydrogens to epoxy groups was 0.20:1.00.

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
|---|---|
| Vinyl acetate | 1.48 |
| 1,2-Dichloroethane | 1.00 |

Example 12: Example According to the Invention: Epoxy-Functional Silane, Silicon-Free Epoxy Resin, and Silicon-Free Amine Curing Agent This example shows the performance of a high stoichiometry composition.

Two paint bases were manufactured using Epikote 862, a bisphenol F based epoxy resin. In one of these bases, sufficient glycidoxypropyl trimethoxy silane was added such that 30% of the epoxide groups were provided by the epoxy-functional silane. The coating without any glycidoxypropyl trimethoxysilane was formulated with a curing agent based on Ancamine 2264 at an amine N—H to an epoxy ratio 0.80. The coating containing glycidoxypropyl trimethoxysilane was also formulated with a curing agent based on Ancamine 2264 at an amine N—H to an epoxy ratio of 1.70. Coatings were applied to a blasted steel substrate and allowed to cure at 25° C. for 10 days. The coatings were tested using ASTM D5499 Method A for dry heat resistance. The coating without any glycidoxypropyl trimethoxysilane gave acceptable performance up to 177° C. whereas the coating containing the glycidoxypropyl trimethoxysilane gave good performance up to 212° C. and even up to 250° C. without any cracking being evident. Using the NACE TM0185 test for autoclave performance (3% sodium chloride solution at 185° C. and 11 bar pressure) the coating containing the glycidoxypropyl trimethoxysilane showed no evidence of blistering after 4 months autoclave immersion, whereas the coating without any glycidoxypropyl trimethoxysilane showed blistering at temperatures as low as 80° C.

Comparative Example 1: Comparative Example with Coating Based on Epoxy Phenol Novolac as Sole Epoxy Resin In this comparative example the relatively high absorption of various organic liquids in a coating prepared using an epoxy phenol novolac (DEN 431) as the sole epoxy resin is illustrated.

DEN 431 (ex. Dow Chemicals) (5.0 g, 0.0285 eq. epoxy) was thoroughly mixed at room temperature with 1.496 g bis(4-aminocyclohexyl) methane (PACM) (0.0285 eq. N—H). The mixture was applied using a 400 μm cube applicator to 6 glass microscope slides pre-weighed accurately to 4 decimal places. The equivalent ratio of active hydrogens to epoxy groups was 1.00:1.00.

The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
|---|---|
| Vinyl acetate | 1.63 |
| 1,2-Dichloroethane | 17.89 |

Comparative Example 2: Comparative Example with Coating Based on Epoxy-Functional Siloxane as Sole Epoxy Resin A comparative example showing that cracking occurs in coatings prepared using an epoxy-functional siloxane as the sole epoxy resin Momentive MP200 (ex. Momentive Performance Chemicals) (11.7959 g, 0.058 eq. epoxy) was thoroughly mixed at room temperature with a mixture of 2.7635 g bis(4-aminocyclohexyl) methane (PACM) (0.0526 eq. N—H), 0.4548 g 1-methylimidazole, and 0.2798 g 2-ethyl-4-methyl-imidazole. The equivalent ratio of active hydrogens to epoxy groups was 0.91:1.00. In this composition the molar ratio of silicon atoms of the organosilane to the epoxy groups in the composition is 1:1.

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and during this process all the films gave severe cracking and delamination. Pieces of free film were weighed accurately to 4 decimal places and placed in individual glass jars containing either vinyl acetate or 1,2-dichloroethane. The mass uptake of vinyl acetate or 1,2-dichloroethane was monitored by removing the film periodically from its jar, gently drying the surface of the film and quickly weighing the film accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

No results could be reported for the % mass uptake as the immersion process caused the free films to further break up into small pieces which could not be individually dried and weighed.

Comparative Example 3: Comparative Example with Coating Based on RDGE

In this comparative example, the low absorption of various organic liquids in a coating prepared using resorcinol diglycidyl ether (RDGE) as the sole epoxy resin is illustrated using a lower equivalent ratio of active hydrogens to epoxy and relying on a post-cure step to anionically polymerise the excess epoxy. This example is representative of the teachings of WO2012/119968.

Resorcinol diglycidyl ether (ex. CVC) (8.0 g, 0.06349 eq. epoxy) was thoroughly mixed at room temperature with a mixture of 1.1581 g bis(4-aminocyclohexyl) methane (PACM) (0.02186 eq. N—H), 0.1906 g 1-methylimidazole and 0.1173 g 2-ethyl-4-methyl-imidazole. The equivalent ratio of active hydrogens to epoxy groups was 0.34:1.00.

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
|---|---|
| Vinyl acetate | 1.61 |
| 1,2-Dichloroethane | 2.12 |

A comparison between this Example and the Examples according to the invention shows that the invention makes it possible to obtain coatings which perform as well as RDGE-based coatings, while the use of the highly sensitising RDGE can be dispensed with.

Comparative Example 4: Comparative Example with Coating Based on RDGE and Epoxy Phenol Novolac In this comparative example the low absorption of various organic liquids in a coating prepared using a blend of resorcinol diglycidyl ether (RDGE) with an epoxy phenol novolac (DEN 431) is illustrated.

Resorcinol diglycidyl ether (ex. CVC) (5.0 g, 0.0397 eq. epoxy) was added to 1.529 g (0.00871 eq. epoxy) DEN 431 (ex. Dow chemicals) and thoroughly mixed at room temperature with a mixture of 0.956 g Ancamine 2264 (ex. Air Products) (0.0177 eq. N—H), 0.1941 g 1-methylimidazole, 0.078 g 2-ethyl-4-methyl-imidazole and 0.122 g tris(dimethylaminomethyl)phenol. The equivalent ratio of active hydrogens to epoxy groups was 0.37.

The mixture was applied using a 400 μm cube applicator to 6 glass microscope slides pre-weighed accurately to 4 decimal places. The coated slides were then placed in an environmental cabinet held at 23° C. and 50% relative humidity and allowed to cure for 24 hours. The coatings were dry well within the 24 hour period. The coated slides were then placed in a fan assisted oven held at 80° C. for 16 hours. On removal from the oven, the slides were allowed to cool to room temperature and the coated slides weighed accurately to 4 decimal places. Each slide was placed in an individual glass jar containing either vinyl acetate or 1,2-dichloroethane. Three coated slides for each solvent were used. The mass uptake of vinyl acetate or 1,2-dichloroethane was monitored by removing the glass slides periodically from its jar, drying the surface of the coated slide and quickly weighing the slide accurately to 4 decimal places. The uptake was expressed as a % of the mass of the original film, calculated as follows:

$$\% \text{ Uptake} = \frac{\text{Mass immersed slide} - \text{Mass coated slide after cure}}{\text{Mass coated slide after cure} - \text{Mass glass slide}} \times 100$$

The results given in the table below represent the average uptake of the three slides for each immersed liquid after 28 days immersion at room temperature.

| Immersion liquid | % Uptake |
|---|---|
| Vinyl acetate | 3.18 |
| 1,2-Dichloroethane | 2.93 |

A comparison between this Example and the Examples according to the invention shows that the invention makes it possible to obtain coatings which perform as well as RDGE-based coatings, while the use of the highly sensitising RDGE can be dispensed with.

The invention claimed is:

1. A method for providing a metallic or concrete surface of a chemical installation with a coating, of the method comprising providing a coating composition comprising epoxy-functional resin and amine curing agent for the epoxy-functional resin, wherein the coating composition comprises an organic silicon-containing compound selected from the group of organosilanes and organosiloxanes, with the molar ratio between the silicon atoms of the organic silicon-containing compound and the epoxy-groups in the coating composition being in the range of 0.25-0.75:1.00, applying the coating composition to a metallic or concrete surface of a chemical installation to form a coating layer, and allowing the coating layer to cure at a temperature in the range of 0 to 50° C.

2. The method according to claim 1, wherein the coating layer is further subjected to a post-curing step at a temperature above 50° C.

3. The method according to claim 1, wherein the chemical installation is a chimney, pipe, or tank.

4. The method according to claim 1, wherein the coating composition comprises amino-functional silane or siloxane, and optionally a silicon-free amine curing agent.

5. The method according to claim 1 wherein the coating composition comprises less than 10 wt. % of RDGE (resorcinol diglycidyl ether).

6. The method according to claim 1 wherein the amount of curing agent present in the coating composition is such that the equivalent ratio of the active hydrogens in the amine curing agent to the epoxy groups of epoxy-functional resin is between about 0.15 and 1.80.

7. The method according to claim 1, wherein the chemical installation is a cargo tank or a storage tank.

8. The method according to claim 1 wherein the coating composition comprises less than 2 wt. % of RDGE (resorcinol diglycidyl ether).

9. The method according to claim 1, wherein the organic silicon-containing compound comprises an epoxy-functional silane or siloxane, an amino-functional silane or siloxane, and/or an organosilane or organosiloxane having no epoxy or amine functionality.

10. The method according to claim 9, wherein the coating composition comprises an epoxy-functional silane or siloxane and a silicon-free epoxy resin.

11. The method according to claim 10, wherein the epoxy-functional silane or siloxane provides 45-55%, of the epoxy-groups present in the system and the silicon-free epoxy-resin provides 45-55%, of the epoxy-groups present in the coating composition.

12. The method according to claim 10, wherein the epoxy-functional silane or siloxane provides 25-75% of the epoxy-groups present in the coating composition and the silicon-free epoxy-resin provides 25-75% of the epoxy-groups present in the coating composition.

13. The method according to claim 9, wherein the organic silicon-containing compound comprises an organosilane or organosiloxane having no epoxy or amine functionality.

14. A chemical installation comprising a metallic or concrete surface provided with a lining of a cured coating composition, wherein the cured coating composition is derived from a coating composition comprising epoxy-functional resin and amine curing agent for the epoxy-functional resin, wherein the coating composition comprises an organic silicon-containing compound selected from the group of organosilanes and organosiloxanes, with the molar ratio between the silicon atoms of the organic silicon-containing compound and the epoxy-groups in the coating composition being in the range of 0.25-0.75:1.00.

15. The chemical installation according to claim 14, which is a chimney, pipe, or tank.

16. The chemical installation according to claim 14, which is a cargo tank or a storage tank.

17. A coating composition suitable for providing a metallic or concrete surface of a chemical installation with a coating, wherein the coating composition comprises epoxy-functional resin, and amine curing agent for the epoxy-functional resin, wherein the coating composition comprises an organic silicon-containing compound selected from the group of organosilanes and organosiloxanes, with the molar ratio between the silicon atoms of the organic silicon-containing compound and the epoxy-groups in the coating composition being in the range of 0.25-0.75:1.00.

18. The coating composition according to claim 17, which is a two-pack coating composition.

* * * * *